Aug. 20, 1929.    F. S. SHIELDS    1,725,217
TRACTOR HITCH FOR PLOWS
Filed March 19, 1926    3 Sheets-Sheet 1
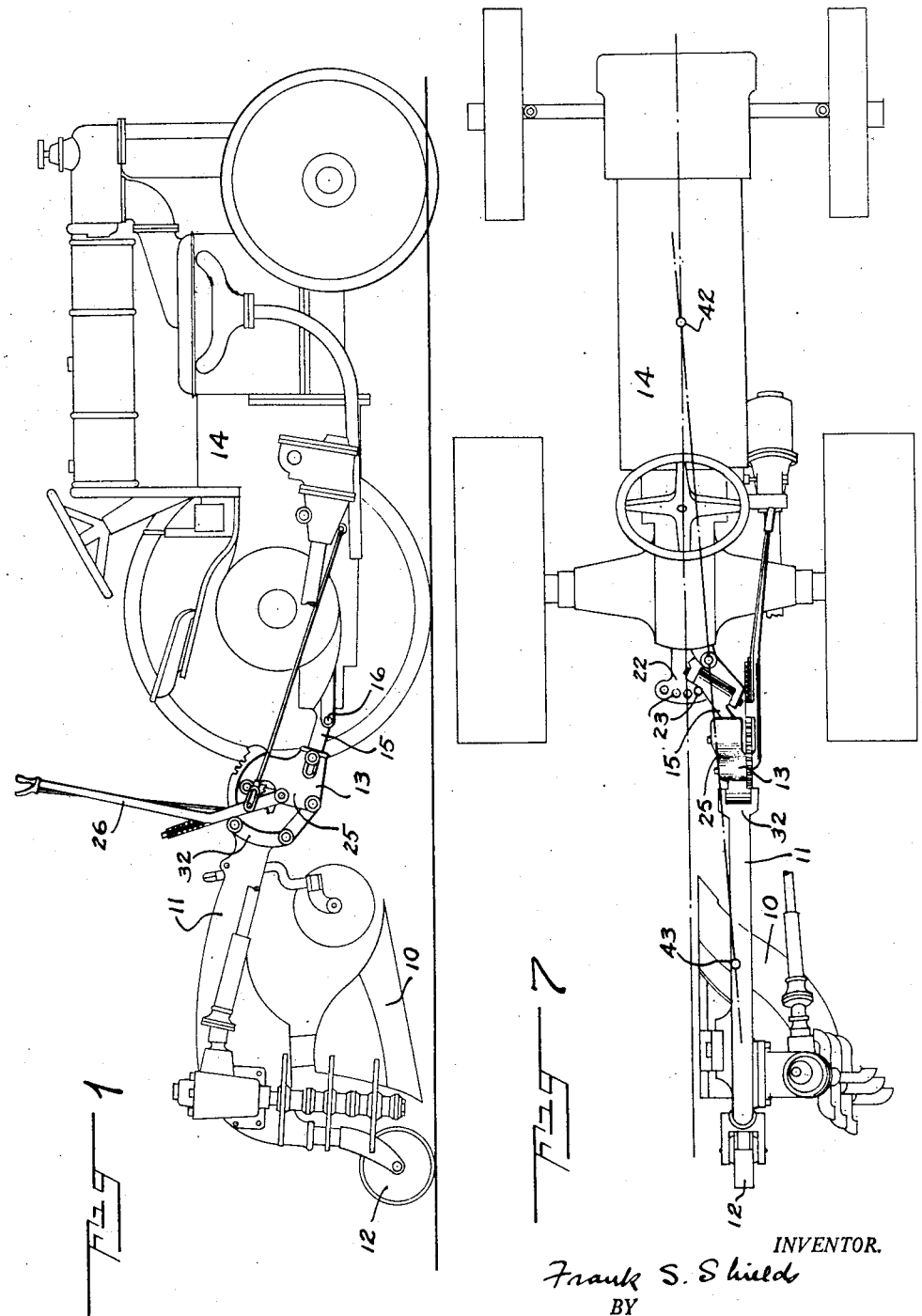
INVENTOR.
Frank S. Shields
BY
Abel L. Browning ATTORNEYS.

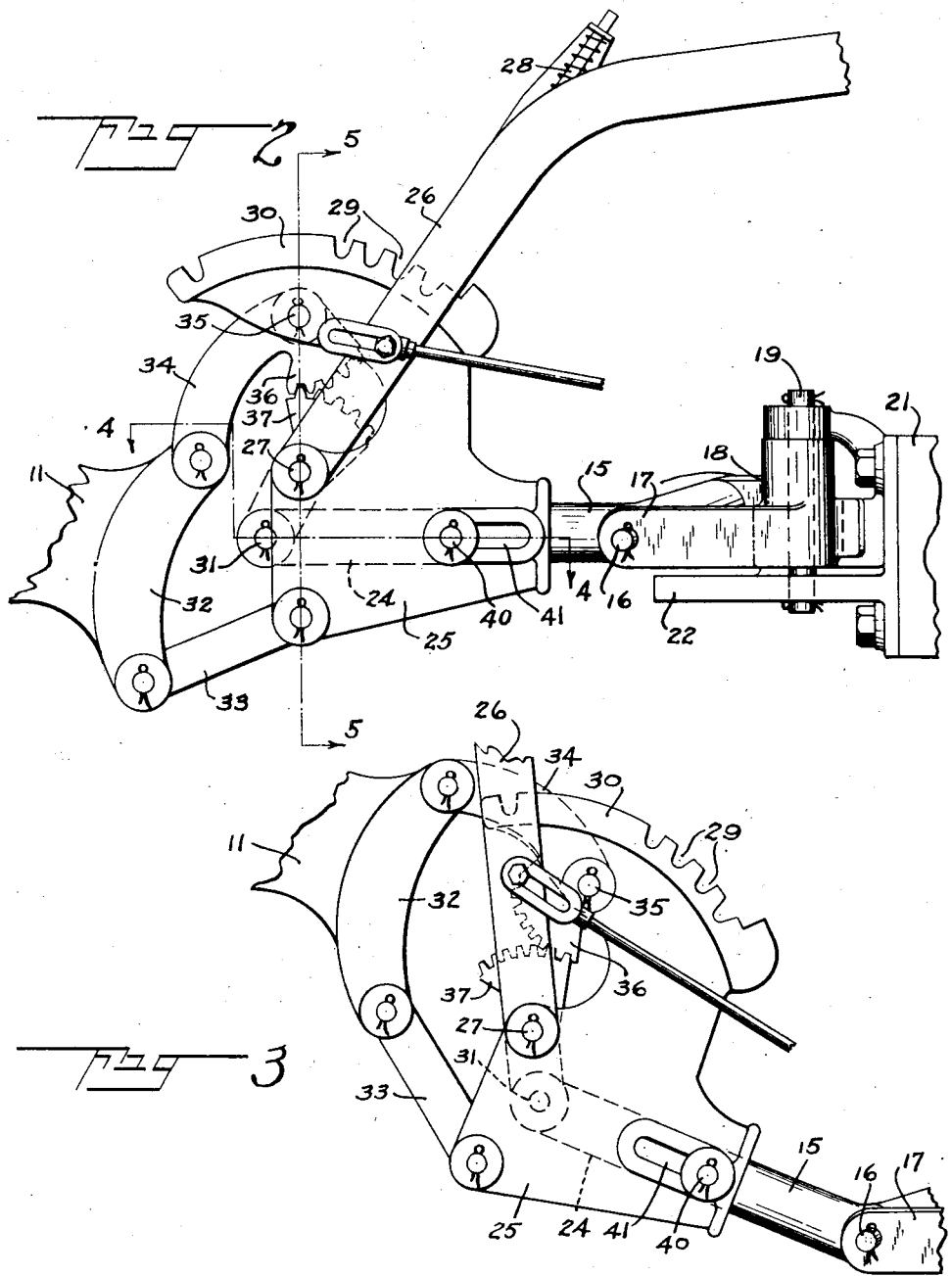

Aug. 20, 1929.   F. S. SHIELDS   1,725,217
TRACTOR HITCH FOR PLOWS
Filed March 19, 1926   3 Sheets-Sheet 3
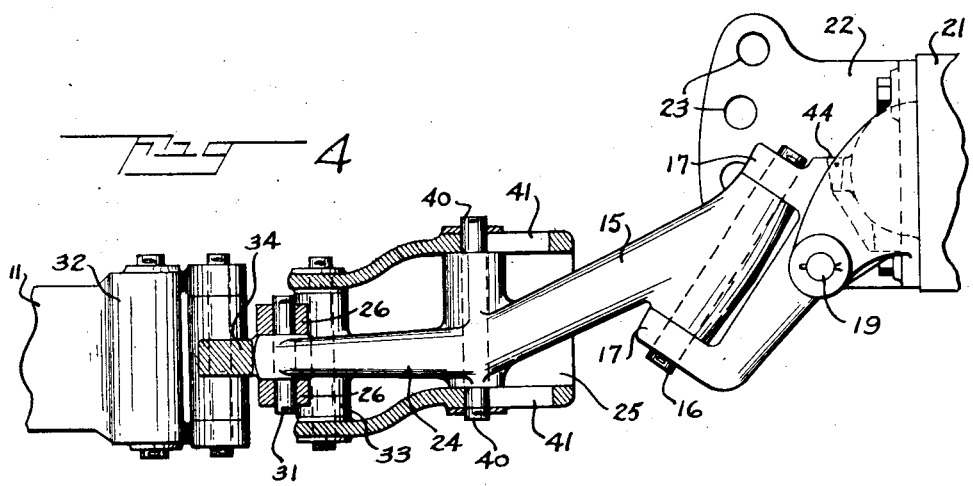
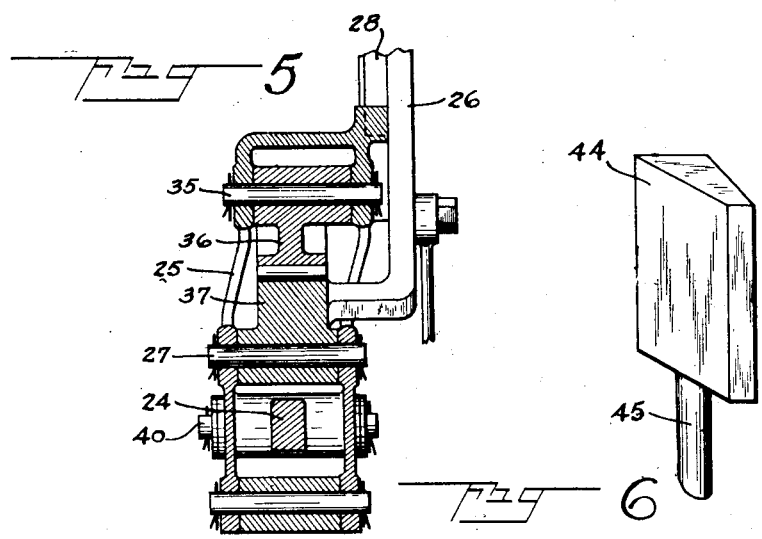
INVENTOR.
Frank S. Shields
BY
Abel L. Browning  ATTORNEYS.

Patented Aug. 20, 1929.

1,725,217

UNITED STATES PATENT OFFICE.

FRANK S. SHIELDS, OF NEW YORK, N. Y.

TRACTOR HITCH FOR PLOWS.

Application filed March 19, 1926. Serial No. 95,834.

This invention relates to a hitch or draft connection for tractor-pulled plows and this application is a continuation in part of my prior application, Serial No. 19,753 filed April 1, 1925.

One of the objects of the invention resides in the use of vertically swinging link members for connecting the rearward end of the draft arm and the forward end of the plow, one of the links being used as a lifting arm for raising and lowering the plow.

Another object of the invention resides in the provision of means for applying the power of the tractor to lift the plow.

Other features of the invention will be hereinafter referred to.

In the drawings, in which a preferred embodiment of the invention has been selected for illustration:

Figure 1 is a view in side elevation of a plow and a tractor having a draft connection embodying this invention.

Figure 2 is a view in side elevation and on an enlarged scale of the draft connection shown in Figure 1, and with the plow beam in its lowered or operating position.

Figure 3 is a view of a portion of the mechanism shown in Figure 2, with the plow beam in its raised or inoperative position.

Figure 4 is a view in horizontal section, taken on the line of 4—4 of Figure 2.

Figure 5 is a view in transverse vertical section, taken on the line 5—5 of Figure 2.

Figure 6 is a perspective view of a locking device used with the draft connection.

Figure 7 is a diagrammatic view showing the relation of the plow and a draft connection pivot to the center of draft of the tractor.

Referring to the drawings for a more detailed description of the invention a plow 10, is supported from a beam 11, which is supplied with a relatively small trailer wheel 12, mounted closely adjacent to the plow. The forward end of the plow beam is coupled to a hitch or draft device 13 which in turn is attached to the tractor 14, and forms a draft connection between the draft vehicle and the plow.

The draft device includes a draft arm 15, which has a hinged or pivoted connection at its forward end with a horizontally disposed and diagonally extending pintle pin 16, mounted in ears 17, on a bracket 18, which has, in turn, a pivotal connection at 19, for lateral swinging relation with a specially formed draw bar head directly attached to the tractor framework 21. The draw bar head includes a plate 22 provided with a row of holes 23, to receive the draft attachments of other implements.

The draft arm 15 is directed rearwardly and diagonally toward the furrow side of the apparatus for a portion of its length, the rearward portion of the arm, as at 24, being extended in a line parallel to the longitudinal axis of travel of the tractor. A hollow support member or head 25, receives a considerable portion of the length of the draft arm 15 and carries a hand lever 26, pivoted to the head at 27. The lever 26 is provided with a locking dog 28, which cooperates with a set of notches 29 in a segment 30. The rearward extremity of the draft arm 15 is pivotally attached to the lower extremity of the hand lever 26 at 31.

The head or lever supporting member 25 is arranged to be coupled to the forward extremity 32 of the plow beam 11 through a link member 33 and a link member or crank arm 34, the link member being arranged in vertically separated relation to rock in the same vertical planes. The upper link or crank arm 34 is fulcrumed at 35 in the head 25 and is provided with a gear segment 36 which meshes with a gear segment 37, carried by the hand lever 26.

With this structural arrangement it will be seen that a forwardly inclined position of the hand lever 26, results in a lowering of the plow beam to operating position as is shown in Figure 2, while a rearwardly inclined or upright position of the hand lever results in a raised position of the plow beam, as in Figures 1 and 3. It will also be seen that a locked condition of the hand lever produces a rigid and immovable condition of the plow beam with relation to the head 25, and that the vertically spaced relation of the links 33 and 34 prevents any tendency of the plow to rotate or rock about a longitudinal axis with relation to the head 25.

Another feature of the invention resides in a power lift construction, which is provided to utilize the pull of the tractor to lift the plow. Referring to Figures 1, 2 and 3 of the drawings, it will be seen that the draft arm 15 is provided with a transverse pin 40 in the side walls of the hollow head member 25. With this arrangement, the unlatching of the hand lever 26 when the tractor is pulling the plow, results in a forward movement of the draw bar with relation to the head 25, this rotative movement being permitted by the slots 41. It will be seen that a forward movement of the draft arm 15 to an extent sufficient to move the pin 40 from the rearmost end of the slots 41, as shown in Figure 2, to the forward end of the slots 41, as shown in Figure 3, results in the movement of the lever 26 to its rearward position and the corresponding lifting of the plow to inoperative position.

Another feature of the invention resides in the provision of the vertical pivot pin 19, which permits the plow to swing horizontally when encountering an obstacle. The pivot 19 is arranged to lie in the line of draft between the center of draft of the tractor, as indicated at 42, and the center of drag or resistance of the plow is at 43. This arrangement or relationship of parts is indicated diagrammatically in Figure 7 and it will be seen that the plow is compelled to travel in the natural line of draft and without exerting side draft effects.

In order to assist in plowing the final furrow in a field and prevent the single remaining furrow slice from pushing the plow laterally out of plowing position, a locking member 44, having a stem 45 may be mounted in the draw bar head as shown in Figure 4, to temporarily prevent swinging of the plow structure about the pivotal point 19.

A longitudinal level of the plow is effected by the arrangement of the links 33 and 34 which connect the plow beam to the head 25. It will be seen that the distance separating the points of connection of the links 33 and 34 with the head 25 is greater than the distance separating the points of connection of the links with the plow beam. The net result of this arrangement is to produce the relative position of the parts shown in Fig. 2, when the plow is in lowered or operating position. Further tilting forward of the plow beam is prevented by the limiting alignment of the arm 34 and the two pivotal points of connection of the links with the plow beam which is obtained in this condition. Forward tilting of the plow on its point or nose is accordingly prevented and a properly leveled position of the plow for most effective operation is accordingly maintained.

What I claim is:

1. In a tractor hitch for plows, a draft arm pivoted at one end to the tractor draw-bar head, a supporting head on the rearward end of the draft arm, link members pivotally connecting the upper and the lower extremities of the head to vertically separated points on the forward end of the plow beam, a hand lever pivotally mounted on the supporting head, an operating connection between the hand lever and the upper link member for rocking the link member about its forward pivot to thereby raise or lower the plow, a connection between the draft arm and said lever, and said draft arm being capable of movement longitudinally with relation to said supporting member, whereby the pull of the tractor can be applied to swing the hand lever and raise the plow.

2. In a tractor hitch for plows, a draft arm designed to be pivoted at one end to a tractor draw bar head, a supporting head at the rearward end of the draft arm, links for pivotally connecting the supporting head to a plow beam, a hand lever pivotally mounted on the supporting head, an operating connection between the hand lever and one of said link members for rocking the link member about its forward pivot to thereby raise or lower the plow, a sliding connection between the draft arm and said lever, and means connected to the lever and designed to be connected to a tractor, whereby the pull of the tractor can be utilized to swing the hand lever and raise the plow.

Signed at New York, in the county and State of New York, this 2nd day of March, 1926.

FRANK S. SHIELDS.